United States Patent
Kawakami et al.

[11] Patent Number: 6,118,649
[45] Date of Patent: Sep. 12, 2000

[54] DIELECTRIC PASTE AND THICK FILM CAPACITOR USING THE SAME

[75] Inventors: Hiromichi Kawakami, Moriyama; Hiroji Tani, Nagaokakyo, both of Japan

[73] Assignee: Murata Manufacturing Co., Ltd., Japan

[21] Appl. No.: 09/014,847

[22] Filed: Jan. 28, 1998

[30] Foreign Application Priority Data

Jan. 29, 1997 [JP] Japan ................................. 9-014879

[51] Int. Cl.$^7$ ................................................ H01G 4/12
[52] U.S. Cl. .................................. 361/321.5; 361/321.4; 361/321.3; 361/321.2; 361/321.1; 361/320; 501/53
[58] Field of Search ................................ 501/53, 55, 60, 501/73, 74, 61, 134, 136, 20, 17, 64; 361/311, 321.1–321.5, 320

[56] References Cited

U.S. PATENT DOCUMENTS

| | | | |
|---|---|---|---|
| 4,027,209 | 5/1977 | Maher | 361/321.4 |
| 4,377,840 | 3/1983 | Nair | 361/320 |
| 4,511,601 | 4/1985 | Akse et al. | |
| 4,906,405 | 3/1990 | Nakatani et al. | 252/518 |
| 5,011,803 | 4/1991 | Park et al. | 501/136 |
| 5,055,958 | 10/1991 | Yagami et al. | 360/122 |
| 5,164,882 | 11/1992 | Kanai et al. | 361/321 |
| 5,344,592 | 9/1994 | Wilczek et al. | 252/512 |
| 5,378,662 | 1/1995 | Tsuyuki | 501/17 |
| 5,561,587 | 10/1996 | Sanada | 361/306.1 |
| 5,814,571 | 9/1998 | Kawakami et al. | 501/20 |

FOREIGN PATENT DOCUMENTS

| | | |
|---|---|---|
| 1646891 | 9/1971 | Germany . |
| 4406812 C1 | 7/1995 | Germany . |
| 63-142707 | 6/1988 | Japan ................ H03B 5/32 |

*Primary Examiner*—Kristine Kincaid
*Assistant Examiner*—Eric W. Thomas
*Attorney, Agent, or Firm*—Ostrolenk, Faber, Gerb & Soffen, LLP

[57] ABSTRACT

Provided is a dielectric paste containing glass powder, lead perovskite compound dielectric powder and organic vehicle, wherein the glass powder has a composition represented by $xBi_2O_3$—$yPbO$—$zSiO_2$ where $x+y+z$ is 100 mol parts and the values of x, y and z are on lines or within a region enclosed by lines passing through five points A(25, 5, 70), B(10, 20, 70), C(10, 60, 30), D(35, 60, 5) and E(90, 5, 5) on a ternary diagram. The dielectric paste allows a minute dielectric film to be formed by sintering at a low temperature below 870° C.

20 Claims, 1 Drawing Sheet

DIELECTRIC PASTE AND THICK FILM CAPACITOR USING THE SAME

BACKGROUND OF THE INVENTION

1. Field of the Invention

The present invention relates to dielectric paste and a thick film capacitor using the same and more particularly to dielectric paste useful as a material for forming a load capacitor of a ceramic oscillator and a thick film capacitor using the same.

2. Related Art

A thick film capacitor is being used, for example, as a component of a thick film integrated circuit. As a dielectric substance for such thick film capacitor, one which is mainly composed of barium titanate ceramics and to which a glass component is added as desired is mainly used.

For instance, an example in which $BaTiO_3$—$CaSnO_3$—$CaSiO_3$ ceramics is used as the dielectric substance is described in Japanese Patent Laid-Open No. 51-48159 and an example in which $BaTiO_3$—$(Pb, Sr)(Ti, Sn)O_3$ and glass are used as the dielectric substance is described in Japanese Patent Laid-Open No. 51-150097. The thick film capacitor is then obtained by forming a dielectric paste by dispersing powder of the above-mentioned dielectric substance and of glass, as desired, into an organic vehicle, applying it on an insulated substrate such as alumina by means of screen-printing or the like and then by sintering in air.

With the development of digital IC technology, a ceramic oscillator using piezoelectric ceramics has come to be used widely as a reference signal (or clock signal) generating element in electronic equipment. Such a ceramic oscillator is normally connected to a load capacitor which conforms to temperature characteristics of a resonator which is necessary in constructing an oscillating circuit. With the miniaturization of recent electronic equipment, the demand for miniaturization of the electronic parts such as the ceramic oscillator is also increasing.

To that end, a trial using a thick film capacitor, instead of a discrete type capacitor, as a load capacitor to be connected to the ceramic oscillator has made to obtain a built-in capacitor ceramic oscillator. However, the thick film capacitor fabricated by using the above-mentioned conventional dielectric paste has had problems as follows.

That is, there has been a problem that the size of a dielectric film obtained is inferior because the conventional dielectric paste contains a high amount of dielectric powder in order to obtain a high dielectric constant. It is necessary to sinter at a high temperature exceeding 900° C. in order to complement the lack of the small size. However, sintering at such high temperature may exert an adverse effect on other circuit elements already formed on the substrate before the sintering, such as a capacitor electrode for the thick film capacitor already formed on the substrate. For instance, because the sintering temperature is 850° C. to 900° C. in general when the above-mentioned capacitor electrode is formed by way of baking, the capacitor electrode may undergo undesirable diffusion, reaction or the like when the dielectric paste is sintered in the temperature exceeding 900° C. Therefore, it is desirable to be able to sinter the dielectric paste at as low a temperature as possible.

SUMMARY OF THE PRESENT INVENTION

An object of the present invention is to provide dielectric paste which solves the above-mentioned problem and a thick film capacitor using such dielectric paste.

The present invention provides a dielectric paste comprising glass powder, lead perovskite compound dielectric powder and organic vehicle, wherein the glass powder has a composition represented by $xBi_2O_3$—$yPbO$—$zSiO_2$, where $x+y+z$ is 100 parts (mol) and the values of x, y and z are on lines or within a region enclosed by lines passing through five points A(25, 5, 70), B(10, 20, 70), C(10, 60, 30), D(35, 60, 5) and E(90, 5, 5) on a ternary diagram thereof.

With the above dielectric paste, a minute dielectric film can be obtained even if it is sintered at the relatively low temperature of less than 870° C., for example. Accordingly, the use of the inventive dielectric paste allows a thick film capacitor which excels in the reliability on the moisture resistance characteristic and the like to be obtained.

In the above dielectric paste, the value of x, y and z is preferably on lines or within a region enclosed by lines passing through four points F(15, 30, 55), G(30, 45, 25), H(45, 30, 25) and I(45, 5, 50) on the ternary diagram.

With the above preferable dielectric paste, the reliability of the humidity resistance can be further improved.

In the above dielectric paste, the Curie point of the dielectric powder is preferably within a range from about 120° C. to 500° C.

The above dielectric paste allows a thick film capacitor whose temperature characteristic of the capacitance shows a positive characteristic to be obtained and the thick film capacitor to be advantageously used specifically as a load capacitor for a ceramic oscillator comprising a resonator having a positive temperature characteristic.

In the above dielectric paste, the glass powder may be within the range from about 35 weight % to about 95 weight % and the dielectric powder may be contained within the range from about 65 weight % to about 5 weight % with respect to the total amount of the glass powder and the dielectric powder. Preferably, the glass is about 40 to 90 wt %. The dielectric paste allows the dielectric film to be formed as a minute film even at such a low temperature value as less than 850° C. for sintering temperature of the dielectric paste.

In the above dielectric paste, the glass powder may comprise more than about 80 mol % of main component having the composition represented by $xBi_2O_3$—$yPbO$—$zSiO_2$ where $x+y+z$ is 100 parts (mol) and the value of x, y and z are on lines or within a region enclosed by lines passing through five points A(25, 5, 70), B(10, 20, 70), C(10, 60, 30), D(35, 60, 5) and E(90, 5, 5) on a ternary diagram and less than about 20 mol % of at least one additional component selected from a group comprising $TiO_2$, $ZrO_2$, BaO and SrO. The dielectric constant of the dielectric film obtained from the dielectric paste containing the glass may be improved further and the control of the capacitance-temperature characteristics (TCC) in the thick film capacitor may be readily made.

The present invention also provides a thick film capacitor comprising a dielectric film containing glass and lead perovskite compound dielectric, wherein the glass has a composition represented by $xBi_2O_3$—$yPbO$—$zSiO_2$ where $x+y+z$ is 100 parts (mol) and the value of x, y and z is on lines or within a region enclosed by lines passing through five points A(25, 5, 70), B(10, 20, 70), C(10, 60, 30), D(35, 60, 5) and E(90, 5, 5) on the ternary diagram.

According to the inventive thick film capacitor, electronic parts such as a ceramic oscillator can be miniaturized or thinned by incorporating this thick film capacitor into the electronic parts instead of a discrete type capacitor. For instance, the use of the inventive thick film capacitor as the load capacitor of a ceramic oscillator allows an oscillator whose oscillating frequency fluctuates less to be obtained and incorporating this thick film capacitor into the ceramic oscillator allows the ceramic oscillator to be thinned and miniaturized.

In the above thick film capacitor, the value of the x, y and z is preferably on lines or within a region enclosed by lines passing through four points F(15, 30, 55), G(30, 45, 25), H(45, 30, 25) and I(45, 5, 50) on the ternary diagram.

In the above thick film capacitor, the Curie point of the dielectric substance is preferably within a range from about 120° C. to 500° C.

In the above thick film capacitor, the glass may be contained within a range from about 35 weight % to about 95 weight % and the dielectric substance may be contained within a range from about 65 weight % to about 5 weight % with respect to the total amount of the glass powder and the dielectric substance.

In the above thick film capacitor, the glass may comprise more than about 80 mol % of main component having the composition represented by $xBi_2O_3$—$yPbO$—$zSiO_2$ where x+y+z is 100 parts (mol) and the values of x, y and z are on lines or within a region enclosed by lines passing through five points A(25, 5, 70), B(10, 20, 70), C(10, 60, 30), D(35, 60, 5) and E(90, 5, 5) on a ternary diagram and less than about 20 mol % of at least one additional component selected from a group comprising $TiO_2$, $ZrO_2$, BaO and SrO.

The above thick film capacitor may be used as a load capacity element for a ceramic oscillator comprising a resonator having a positive temperature characteristic.

The invention also provides use of the above dielectric paste for a thick film capacitor having a dielectric film, wherein the dielectric paste is used for providing the dielectric film.

The present invention will be better understood from the following embodiment taken in conjunction with the accompanying drawings.

PREFERRED EMBODIMENTS OF THE PRESENT INVENTION

First Embodiment

Figure 2:
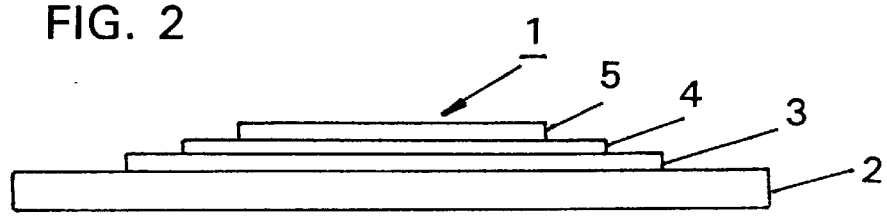
FIG. 2 is a section view showing a thick film printed circuit device 2 provided with a thick film capacitor 1 fabricated in the first through third embodiments of the present invention.

FIG. 2 is a section view showing a thick film printed circuit device provided with a thick film capacitor 1 to be fabricated in this first embodiment. The thick film printed circuit device has a substrate 2 made of an electrically insulating material and a sub-layer conductor 3, a dielectric film 4 and an upper layer conductor 5 facing to the sub-layer conductor 3 via the dielectric film 4. The layers are formed sequentially on the substrate 2.

The dielectric paste of the present invention is used to form the above-mentioned dielectric film 4. That is, after forming the sub-layer conductor 3 which becomes one of capacitor electrodes of the thick film capacitor 1, the dielectric paste is applied on the sub-layer conductor 3 and is then sintered to form the dielectric film 4. After that, the upper layer conductor 5 which becomes the other capacitor electrode of the thick film capacitor 1 is formed. The characteristics of the thick film capacitor 1 thus obtained will be evaluated as described later in the first embodiment.

The dielectric paste was fabricated as follows. $Bi_2O_3$, PbO and $SiO_2$ were prepared as starting materials of a glass component and blended so that the glass composition (mol %) shown in Table 1 is obtained. Then, the blend thus obtained was melted under a temperature of 1100° C. to 1500° C. to make a molten glass. Then, after putting this molten glass into pure water to quench it, it was crushed to obtain a glass powder.

TABLE 1

| Sample No. | $Bi_2O_3$ | PbO | $SiO_2$ |
|---|---|---|---|
| 1 | 25 | 5 | 70 |
| 2 | 10 | 20 | 70 |
| 3 | 10 | 60 | 30 |
| 4 | 35 | 60 | 5 |
| 5 | 90 | 5 | 5 |
| 6 | 45 | 5 | 50 |
| 7 | 15 | 30 | 55 |
| 8 | 30 | 45 | 25 |
| 9 | 45 | 30 | 25 |
| 10 | 10 | 10 | 80 |
| 11 | 0 | 70 | 30 |
| 12 | 20 | 70 | 10 |
| 13 | 60 | 40 | 0 |
| 14 | 70 | 0 | 30 |

Figure 1:
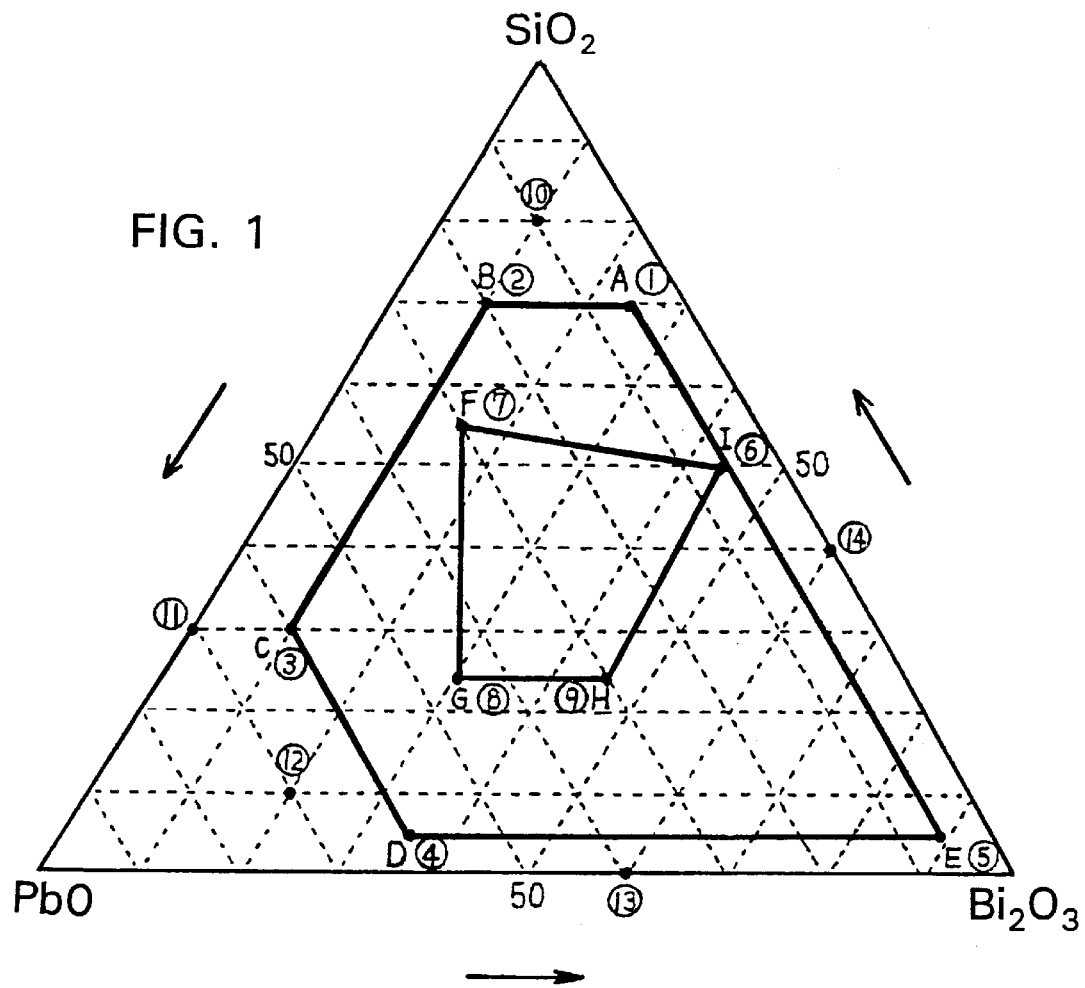
FIG. 1 is a ternary diagram of $xBi_2O_3$—$yPbO$—$zSiO_2$ showing the composition range of glass power contained in the inventive dielectric paste.

The composition of each sample shown in Table 1 is plotted in a ternary diagram in FIG. 1. In FIG. 1, numbers surround by circles correspond to the sample Nos. in Table 1.

Meanwhile, a lead perovskite compound ceramic represented by $(Pb_{0.97}Sr_{0.03})\{(Sb_{0.5}Sn_{0.5})_{0.05}Zr_{0.46}Ti_{0.49}\}O_3$ having a Curie point of 280° C. was crushed to obtain a dielectric powder.

Next, the glass powder and the dielectric powder were mixed together with an organic vehicle so that the glass powder/dielectric powder/organic vehicle=35/35/30 (weight %) and were kneaded to prepare the dielectric paste. The organic vehicle here was obtained by dissolving acrylic resin into α-terpineol.

Next, the dielectric paste obtained as described above was used as the dielectric film 4 to fabricate the thick film printed circuit device 1 having the thick film capacitor as shown in FIG. 2.

That is, a sub-layer conductor 3, 8 mm in diameter, was formed by providing an alumina substrate as the substrate 2, by screen-printing a Ag/Pd paste thereon and by sintering at 850° C. Next, a 6 mm diameter disk-shaped dielectric film 4 was formed by screen-printing the dielectric paste prepared in advance on the sub-layer conductor 3 and sintering at a temperature from 850° C. to 890° C. as shown in Table 2. Then, the upper layer conductor 5 having a diameter of 4 mm was formed on the dielectric film 4 by preparing a thermosetting Ag paste, by screen-printing it on the dielectric film 5 and heating to set it.

Thus, the thick film printed circuit device having the thick film capacitor 1 was completed.

Next, in order to determine the characteristics of the thick film capacitor 1, i.e. to find the characteristics of capacitance, dielectric loss, dielectric constant and capacity-temperature characteristic (TCC) shown in Table 2, the required measurement was implemented to evaluate the characteristics of the dielectric film 4. As for the capacitance and the dielectric loss (tan δ), the measurement was carried out under the conditions of 1 MHz frequency, 1 Vrms voltage and 25° C. temperature and the dielectric constant ($\in_x$) was calculated from the obtained capacitance and the size of the thick film capacitor 1. Further, the insulation resistance (IR) was measured by applying 100 V of dc voltage for one minute after leaving the samples within an atmosphere of 85° C. temperature and 85% relative humidity. The capacity-temperature characteristic (TCC) in temperature from −20° C. through +80° C. was measured under the conditions of 1 MHz frequency and 1 Vrms voltage.

temperature of 890° C. as shown in Table 2 because the softening point of the glass is too high and the dielectric film 4 can be hardly obtained by sintering in a temperature below 870° C. However, even if it is sintered at the temperature of 890° C., the thick film capacitor 1 thus obtained has a dielectric constant of only 20.

Further, Sample 11 is not preferable because the dielectric loss is as large as 1.9% and log IR is less than 9. It is considered that a glass located at the region where Sample 11 is positioned is inferior in terms of the minuteness of the dielectric film 4.

Still further, Sample 12 is not preferable because the dielectric loss is as large as 2.3% and log IR is less than 9.

TABLE 2

| Sample No. | Sintering Temperature (° C.) | Capacitance (pF) | Dielectric Loss (%) | Dielectric Constant $\in_x$ | Insulation Resistance log IR (W) | TCC (%/° C.) |
|---|---|---|---|---|---|---|
| 1 | 870 | 138 | 1.0 | 25 | >9 | 0.04 |
| 2 | 870 | 166 | 1.2 | 30 | >9 | 0.05 |
| 3 | 850 | 276 | 1.5 | 50 | >9 | 0.09 |
| 4 | 850 | 442 | 1.7 | 80 | >9 | 0.18 |
| 5 | 850 | 436 | 1.6 | 79 | >9 | 0.16 |
| 6 | 850 | 177 | 1.3 | 32 | >11 | 0.07 |
| 7 | 850 | 226 | 1.4 | 41 | >11 | 0.07 |
| 8 | 850 | 397 | 1.6 | 72 | >11 | 0.16 |
| 9 | 850 | 304 | 1.5 | 55 | >11 | 0.10 |
| 10 | 890 | 110 | 0.8 | 20 | >9 | 0.04 |
| 11 | 850 | 221 | 1.9 | 40 | <9 | 0.07 |
| 12 | 850 | 331 | 2.3 | 60 | <9 | 0.10 |
| 13 | 850 | — | — | — | — | — |
| 14 | 850 | — | — | — | — | — |

In Tables 1 and 2, Samples 1 through 9 are included within the scope of the present invention. As for the composition of the glass powder contained in the used dielectric paste or of the glass contained in the dielectric film 4 of the obtained thick film capacitor 1, Samples 1 through 9 have a composition represented by $xBi_2O_3$—$yPbO$—$zSiO_2$ and their ratio of composition (x, y, z) falls within a region surrounded by Point A (25, 5, 70), Point B (10, 20, 70), Point C (10, 60, 30), Point D (35, 60, 5) and Point E (90, 5, 5) in the ternary diagram of FIG. 1. Samples 1 through 9 allow the thick film capacitor 1 to have a dielectric constant of 25 through 80, a dielectric loss of less than 1.7%, an insulation resistance (IR) which exceeds 9 in terms of log IR after the humidity test and a temperature coefficient of capacitance having a positive inclination of 0.04 to 0.18% to be obtained. Further, Samples 1 through 9 allow the thick film capacitor 1 having the above-mentioned characteristics to be obtained by the dielectric film 4 formed by sintering in a temperature below 870° C.

Note further that for Samples 6 through 9 of the above-mentioned Samples 1 through 9, their reliability on humidity testing has been improved further as log IR after the humidity test exceeds 11. As for the composition of the glass powder contained in the dielectric paste thus used or of the glass contained in the dielectric film 4 of the thick film capacitor 1 thus obtained, Samples 6 through 9 have a composition represented by $xBi_2O_3$—$yPbO$—$zSiO_2$ where the ratio of composition (x, y, z) falls within a region surrounded by Point F (15, 30, 55), Point G (30, 45, 25), Point H (45, 30, 25) and Point I (45, 5, 50) on the ternary diagram of FIG. 1. It is also noted that the dielectric film 4 has been formed by sintering at such a relatively low temperature of 850° C in Samples 6 through 9.

In contrast, Sample 10 which is located in the region where there is a large amount of $SiO_2$ requires a sintering It is considered that glass located at the region where Sample 12 is positioned has a low vitrification degree and is inferior in terms of the minuteness of the dielectric film 5.

No characteristic values are described in Table 2 as for Samples 13 and 14 because they were unmeasurable.

Second Embodiment

The dielectric paste was prepared by mixing the glass powder of Sample 8 prepared in the first embodiment and the dielectric powder of the lead perovskite compound used also in the first embodiment so that their ratio is as shown in the following Table 3, and by adding the organic vehicle so that the ratio of the (glass powder+dielectric powder)/organic vehicle=70/30 (weight %) and kneading. It is noted that as the organic vehicle, one obtained by dissolving acrylic resin into α-terpineol was used similarly to the first embodiment.

TABLE 3

| Sample No. | Glass Powder | Dielectric Powder |
|---|---|---|
| 2-1 | 95 wt % | 5 wt % |
| 2-2 | 90 wt % | 10 wt % |
| 2-3 | 70 wt % | 30 wt % |
| 2-4 | 50 wt % | 50 wt % |
| 2-5 | 40 wt % | 60 wt % |
| 2-6 | 35 wt % | 65 wt % |
| 2-7 | 30 wt % | 70 wt % |
| 2-8 | 10 wt % | 90 wt % |

Next, the thick film capacitor 1 was fabricated in the same manner with the first embodiment by using the dielectric paste obtained as described above. It is noted that the sintering temperature in forming the dielectric film 5 was set at 850° C. After that, the characteristics of the thick film capacitor 1 thus obtained, i.e. the capacitance, dielectric loss, dielectric constant, insulation resistance after humidity test and TCC, were found in the same manner with the first embodiment. Table 4 shows the results.

TABLE 4

| Sample No. | Capacitance (pF) | Dielectric Loss (%) | Dielectric Constant $\epsilon_x$ | Insulation Resistance log IR (W) | TCC (%/° C.) |
| --- | --- | --- | --- | --- | --- |
| 2-1 | 138 | 1.5 | 25 | >9 | 0.06 |
| 2-2 | 160 | 0.5 | 29 | >9 | 0.06 |
| 2-3 | 304 | 1.4 | 55 | >9 | 0.13 |
| 2-4 | 397 | 1.6 | 72 | >9 | 0.16 |
| 2-5 | 447 | 1.6 | 81 | >9 | 0.18 |
| 2-6 | 491 | 1.7 | 89 | >9 | 0.19 |
| 2-7 | 530 | 2.0 | 96 | <9 | 0.21 |
| 2-8 | 784 | 2.4 | 142 | <9 | 0.23 |

As it is apparent from Tables 3 and 4, Samples 2-7 and 2-8 are not preferable because the dielectric loss exceeds 2.0% and the insulation resistance (IR) after the humidity test is less than 9 in terms of log IR. This shows that the dielectric film 4 cannot be formed as a minute film when the sintering temperature of the dielectric paste is 850° C. or less in the present embodiment. It is noted that although the dielectric paste has been printed only once in forming the dielectric film 4, it is considered that the insulation after the humidity test will not increase, though the initial insulation may increase, even if the number of times of printing is increased to increase the thickness of the dielectric film.

In contrast, Samples 2-1 through 2-6 show preferable results in that the dielectric loss is less than 1.7% and the insulation resistance (IR) after the humidity test exceeds 9 in terms of log IR. It can be said from this fact that the ratio of the glass powder and the dielectric powder contained in the dielectric paste used in forming the dielectric film 4 is preferred to be such that glass is within a range from about 35 weight % to 95 weight % and the dielectric substance is within a range from about 65 weight % to 5 weight % with respect to the total amount of the glass and the dielectric substance.

Third Embodiment

The thick film printed circuit device having the thick film capacitor 1 shown in FIG. 2 was fabricated.

At first, the dielectric paste for forming the dielectric film 4 provided in the thick film printed circuit device was fabricated as follows. $Bi_2O_3$, PbO, $SiO_2$, $TiO_2$, $ZrO_2$ and $BaCO_3$ were prepared as starting materials of the glass component and were blended so that the glass composition (mol %) shown in Table 5 is obtained. Then, the blend thus obtained was melted under a temperature of 1100° C. through 1500° C. to make a molten glass in the same manner with the first embodiment. Then, after putting this molten glass into pure water to quench it, it was crushed to obtain glass powder.

TABLE 5

| Sample No. | $Bi_2O_3$ | PbO | $SiO_2$ | $TiO_2$ | $ZrO_2$ | BaO | SrO |
| --- | --- | --- | --- | --- | --- | --- | --- |
| 3-1 | 28 | 28 | 24 | 20 | | | |
| 3-2 | 24.5 | 24.5 | 21 | 30 | | | |
| 3-3 | 28 | 28 | 24 | | 20 | | |
| 3-4 | 24.5 | 24.5 | 21 | | 30 | | |
| 3-5 | 28 | 28 | 24 | | | 20 | |
| 3-6 | 24.5 | 24.5 | 21 | | | 30 | |
| 3-7 | 28 | 28 | 24 | | | | 20 |

TABLE 5-continued

| Sample No. | $Bi_2O_3$ | PbO | $SiO_2$ | $TiO_2$ | $ZrO_2$ | BaO | SrO |
| --- | --- | --- | --- | --- | --- | --- | --- |
| 3-8 | 24.5 | 24.5 | 21 | | | | 30 |
| 3-9 | 28 | 28 | 24 | 5 | 5 | 5 | 5 |
| 3-10 | 35 | 35 | 30 | | | | |

In Table 5, the glass powder of Samples 3-1 through 3-9 contain at least one of $TiO_2$, $ZrO_2$, BaO and SrO as an additional component beside the main components of $Bi_2O_3$, PbO and $SiO_2$. Samples 3-1, 3-3, 3-5, 3-7 and 3-9 contain 80 mol % main component and 20 mol % additional component. On the other hand, Samples 3-2, 3-4, 3-6 and 3-8 contain 70 mol % main components and 30 mol % additional component. The glass powder of Sample 3-10 contains only the main components of $Bi_2O_3$, PbO and $SiO_2$.

Meanwhile, a dielectric powder obtained by crushing the lead perovskite compound ceramic represented by $(Pb_{0.97}Sr_{0.03})\{(Sb_{0.5}Sn_{0.5})_{0.05}Zr_{0.46}Ti_{0.49}\}O_3$ having Curie point of 280° C. was prepared similarly to the one used in the first embodiment.

Further, a vehicle obtained by dissolving acrylic resin into α-terpineol was used as the organic vehicle similarly to that used in the first embodiment.

Next, the glass powder, dielectric powder and organic vehicle were mixed so that the glass powder/dielectric powder/organic vehicle=35/35/30 (weight %) and were kneaded to prepare the dielectric paste.

Next, the dielectric paste obtained as described above was used as the dielectric film 4 to fabricate the thick film printed circuit device having the thick film capacitor 1 as shown in FIG. 2. Here, the thick film printed circuit device having the thick film capacitor 1 was completed by the same design and method of the first embodiment except of that the dielectric paste screen-printed on the sub-layer conductor 3 was sintered at a temperature of 850° C. for all the samples in order to form the dielectric film 4 on the sub-layer conductor 3.

After that, the characteristics of the thick film capacitor 1 thus obtained, i.e. the capacitance, dielectric loss, dielectric constant, insulation resistance and capacity-temperature characteristic (TCC), were found in the same manner with the first embodiment. Table 6 shows the results.

TABLE 6

| Sample No. | Capacitance (pF) | Dielectric Loss (%) | Dielectric Constant $\epsilon_x$ | Insulation Resistance log IR (W) | TCC (%/° C.) |
| --- | --- | --- | --- | --- | --- |
| 3-1 | 359 | 1.8 | 65 | >11 | 0.09 |
| 3-2 | 387 | 2.4 | 70 | <9 | — |
| 3-3 | 353 | 1.7 | 64 | >11 | 0.10 |
| 3-4 | 419 | 3.4 | 76 | <9 | — |
| 3-5 | 332 | 1.7 | 60 | >11 | 0.10 |
| 3-6 | 426 | 2.6 | 77 | <9 | — |
| 3-7 | 354 | 1.8 | 64 | >11 | 0.16 |
| 3-8 | 277 | 2.9 | 50 | <9 | — |
| 3-9 | 381 | 1.6 | 69 | >11 | 0.14 |
| 3-10 | 293 | 1.5 | 53 | >11 | 0.10 |

TCC measured values for Samples 3-2, 3-4, 3-6 and 3-8 in Table 6 were not found.

As it is apparent from Tables 5 and 6, Samples 3-1, 3-3, 3-5, 3-7 and 3-9 which contain 20 mol % or less of at least one of $TiO_2$, $ZrO_2$, BaO and SrO allow the dielectric constant to be improved further as compared to Samples 3-2, 3-4, 3-6 and 3-8 which contain the same additional component but more than about 20 mol %.

Further, the control of the TCC or more specifically, the change of the TCC may be relatively readily accomplished by including about 20 mol % or less of the above-mentioned additional component as is apparent by comparing the Samples 3-1, 3-3, 3-5, 3-7 and 3-9 which contain at least one of $TiO_2$, $ZrO_2$, BaO and SrO at about 20 mol % or less in total and by comparing Sample 10 which contain no additional component with Samples 3-1, 3-3, 3-5, 3-7 and 3-9.

Meanwhile, Samples 3-2, 3-4, 3-6 and 3-8 which contain more than 20 mol % of the additional component have degradation of the dielectric loss (tan δ) and of the insulation resistance. This is considered to have been caused because no good dielectric film has been obtained because the degree of vitrification of the glass thus obtained might be degraded or the crystal melting temperature might be lowered.

Fourth Embodiment

Figure 3:
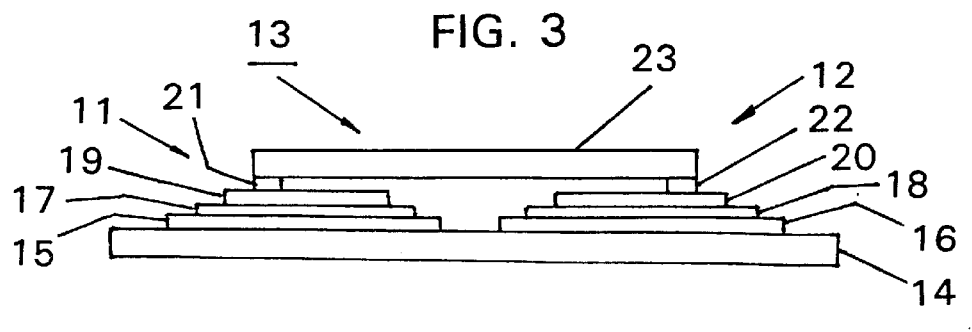
FIG. 3 is section view showing a ceramic oscillator 13 into which thick film capacitors 11 and 12 are incorporated and which is fabricated in a fourth embodiment of the present invention.

FIG. 3 is section view showing a ceramic oscillator 13 having thick film capacitors 11 and 12 and which is to fabricated in this fourth embodiment.

The ceramic oscillator 13 has a substrate 14 made of an electrically insulating material. On the substrate 14, sub-layer conductors 15 and 16, dielectric films 17 and 18 and upper layer conductors 19 and 20 facing, respectively, the sub-layer conductors 15 and 16 via dielectric films 17 and 18 compose the thick film capacitors 11 and 12 are formed symmetrically and sequentially on the substrate 14.

Conductive adhesives 21 and 22 are applied on the upper layer conductors 19 and 20 to electrically connect and to mechanically hold a resonator element 23 composed of piezoelectric ceramics to the upper layer conductors 19 and 20 via the conductive adhesives 21 and 22.

The dielectric paste of the present invention is used to form the above-mentioned dielectric films 17 and 18.

Next, a method for fabricating the ceramic oscillator 13 will be explained.

At first, 2.5 mm square sub-layer conductors 15 and 16 were formed by preparing an alumina substrate as the substrate 14, screen printing a Ag/Pd paste thereon and sintering at 850° C. Next, 2.0 mm square dielectric films 17 and 18 were formed on the sub-layer conductors 15 and 16 by screen-printing the dielectric paste of Sample 9 in the first embodiment, Samples 2-4 and 2-5 in the second embodiment and Sample 3-9 in the third embodiment on the sub-layer conductors 15 and 16 and sintering them at a temperature of 850° C. Then, 1.5 mm square upper layer conductors 19 and 20 were formed on the dielectric films 17 and 18 by preparing a thermosetting Ag paste, screen-printing it on the dielectric films 17 and 18 and by heating and setting them. Further, the resonator element 23 composed of PZT piezoelectric ceramic was secured on the upper layer conductors 19 and 20 via the conductive adhesives 21 and 22. Thus, the ceramic oscillator 13 in which the thick film capacitors 11 and 12 are incorporated was completed.

Next, the initial deviation of oscillating frequency, the temperature characteristic of the oscillating frequency (−40° C. to +125° C.) and the resonance resistance were found for the ceramic oscillator 13 thus obtained. Table 7 shows the results.

TABLE 7

| Sample No. | Initial Deviation of Oscillating Frequency (%) | Temperature Characteristics of Oscillating Frequency (%) | Resonance Resistance (W) |
| --- | --- | --- | --- |
| 9 | 0.1 | 0.03 | 15 |
| 2-4 | 0.08 | 0.01 | 15 |
| 2-5 | 0.09 | 0.05 | 15 |
| 3-9 | 0.1 | 0.02 | 15 |

As shown in Table 7, the use of the thick film capacitors 11 and 12 composed of the inventive dielectric paste allows a ceramic oscillator 13 whose oscillating frequency fluctuates less to be obtained. Further, because the thick film capacitors 11 and 12 may be used as a load capacity of the ceramic oscillator 13, the ceramic oscillator 13 may be thinned and miniaturized.

Other Embodiments

Although $(Pb_{0.97}Sr_{0.03})\{(Sb_{0.5}Sn_{0.5})_{0.05}Zr_{0.46}Ti_{0.49}\}O_3$ has been used as the lead perovskite compound dielectric substance in the embodiments described above, the present invention is not confined only to that. Various lead perovskite compounds of $PbTiO_3$ system, $PbTiO_3$—$Pb(Mg_{1/3}Nb_{2/3})O_3$ system, $PbTiO_3$—$Pb(Mg_{1/2})O_3$ system, $PbTiO_3$—$Pb(Zn_{1/3}Nb_{2/3})O_3$ system, $PbZrO_3$ system, $PbZrO_3$—$Pb(Mg_{1/3}Nb_{2/3})O_3$ system, $PbZrO_3$—$Pb(Mg_{1/2}W_{1/2})O_3$ system, $PbZrO_3$—$Pb(Ni_{1/2}W_{1/2})O_3$ system, $PbZrO_3$—$Pb(Zr_{1/2}Nb_{2/3})O_3$ system, $Pb(Zn_{1/3}Nb_{2/3})O_3$ system and the like may be used. Thick film capacitors whose temperature coefficient of the capacitance shows a positive characteristic may be obtained by selecting those whose Curie point falls within a range from 120° C. through 500° C.

Further, although a vehicle which was obtained by dissolving acrylic resin into α-terpineol has been used as the organic vehicle for the dielectric paste in the embodiments described above, the present invention is not confined only to that. In addition, ethyl cellulose resin, nitrocellulose resin, butylal resin and the like may be used as the resin component and an alcohol type solvent such as butyl carbitol, an ester solvent such as butyl carbitol acetate and acetic ester or kerosene may be used if desired. It is also possible to add a plasticizer such as a phthalate in accordance to the use envisioned.

Further, the inventive dielectric paste may be applied not only in obtaining the thick film capacitor formed on the insulating substrate such as the alumina substrate as described in the above-mentioned embodiments, but also in forming a capacitor on a dielectric substrate such as a multi-layered ceramic substrate for example.

Still further, although the sub-layer conductor electrodes 4 or 15 and 16 of the thick film capacitor 1 or 11 and 12 was formed of Ag/Pd by means of baking and the upper layer conductor 5 or 19 and 20 as the other capacity electrode was formed by the thermosetting Ag paste in the above-mentioned embodiments, the present invention is not confined only to that. Baking type conductors such as Ag, Ag/Pt and Au may be used as the sub-layer conductor and baking type conductors or thermosetting conductors such as Ag, Ag/Pt, Au, Ag/Pd and Cu may be used as the upper layer conductor, respectively.

While the invention has been described in detail and with reference to specific embodiments thereof, it will be apparent to one skilled in the art that various changes and modifications can be made therein without departing from the spirit and scope thereof.

What is claimed is:

1. A dielectric paste comprising glass powder, lead perovskite compound dielectric powder and organic vehicle, wherein the glass powder comprises a composition represented by $xBi_2O_3$—$yPbO$—$zSiO_2$ where x+y+z is 100 mol parts and the values of x, y and z are on lines or within a region enclosed by lines passing through five points A(25, 5, 70), B(10, 20, 70), C(10, 60, 30), D(35, 60, 5) and E(90, 5, 5) on a ternary diagram thereof.

2. The dielectric paste according to claim 1, wherein the values of the x, y and z are on lines or within a region enclosed by lines passing through four points F(15, 30, 55), G(30, 45, 25), H(45, 30, 25) and I(45, 5, 50) on the ternary diagram.

3. The dielectric paste according to claim 2 wherein the Curie point of the dielectric powder is within a range from about 120° C. to 500° C.

4. The dielectric paste according to claim 3, wherein the glass powder is about 35 to 95 weight % and the dielectric powder is about 65 to 5 weight % with respect to the total amount of the glass powder and the dielectric powder.

5. The dielectric paste according to claim 4, wherein the glass powder is more than about 80 mol % of a component having the composition represented by $xBi_2O_3$—$yPbO$—$zSiO_2$ and less than about 20 mol % of at least one additional component selected from the group consisting of $TiO_2$, $ZrO_2$, BaO and SrO.

6. The dielectric paste according to claim 1 wherein the Curie point of the dielectric powder is within a range from about 120° C. to 500° C.

7. The dielectric paste according to claim 6, wherein the glass powder is about 35 to 95 weight % and the dielectric powder is about 65 to 5 weight % with respect to the total amount of the glass powder and the dielectric powder.

8. The dielectric paste according to claim 7, wherein the glass powder is more than about 80 mol % of a component having the composition represented by $xBi_2O_3$—$yPbO$—$zSiO_2$ and less than about 20 mol % of at least one additional component selected from the group consisting of $TiO_2$, $ZrO_2$, BaO and SrO.

9. The dielectric paste according to claim 1, wherein the glass powder is about 35 to 95 weight % and the dielectric powder is about 65 to 5 weight % with respect to the total amount of the glass powder and the dielectric powder.

10. The dielectric paste according to claim 1, wherein the glass powder is more than about 80 mol % of a component having the composition represented by $xBi_2O_3$—$yPbO$—$zSiO_2$ and less than about 20 mol % of at least one additional component selected from the group consisting of $TiO_2$, $ZrO_2$, BaO and SrO.

11. A thick film capacitor comprising a dielectric film containing glass and lead perovskite compound dielectric substance, wherein the glass comprises a composition represented by $xBi_2O_3$—$yPbO$—$zSiO_2$ where x+y+z is 100 mol parts and the values of x, y and z are on lines or within a region enclosed by lines passing through five points A(25, 5, 70), B(10, 20, 70), C(10, 60, 30), D(35, 60, 5) and E(90, 5, 5) on a ternary diagram thereof.

12. The thick film capacitor according to claim 11, wherein the value of the x, y and z are on lines or within a region enclosed by lines passing through four points F(15, 30, 55), G(30, 45, 25), H(45, 30, 25) and I(45, 5, 50) on the ternary diagram.

13. The thick film capacitor according to claim 12, wherein the Curie point of the dielectric substance is within a range from about 120° C. to 500° C.

14. The thick film capacitor according to claim 13, wherein the glass is from about 35 to 95 weight % and the dielectric substance is from about 65 to 5 weight % with respect to the total amount of the glass powder and the dielectric substance.

15. The thick film capacitor according to claim 14, wherein the glass comprises more than about 80 mol % of main component having the composition represented by x $Bi_2O_3$—$yPbO$—$zSiO_2$ and less than about 20 mol % of at least one additional component selected from the group consisting of $TiO_2$, $ZrO_2$, BaO and SrO.

16. The thick film capacitor according to claim 11, wherein the Curie point of the dielectric substance is within a range from about 120° C. to 500° C.

17. The thick film capacitor according to claim 11, wherein the glass is from about 35 to 95 weight % and the dielectric substance is from about 65 to 5 weight % with respect to the total amount of the glass powder and the dielectric substance.

18. The thick film capacitor according to claim 11, wherein the glass comprises more than about 80 mol % of main component having the composition represented by x $Bi_2O_3$—$yPbO$—$zSiO_2$ and less than about 20 mol % of at least one additional component selected from the group consisting of $TiO_2$, $ZrO_2$, BaO and SrO.

19. A ceramic oscillator comprising a resonator having a positive temperature characteristic and the thick film capacitor according to claim 13.

20. A ceramic oscillator comprising a resonator having a positive temperature characteristic and the thick film capacitor according to claim 16.

* * * * *